April 2, 1957  J. F. STORM  2,787,783
LIQUID LEVEL INDICATORS
Filed June 18, 1954
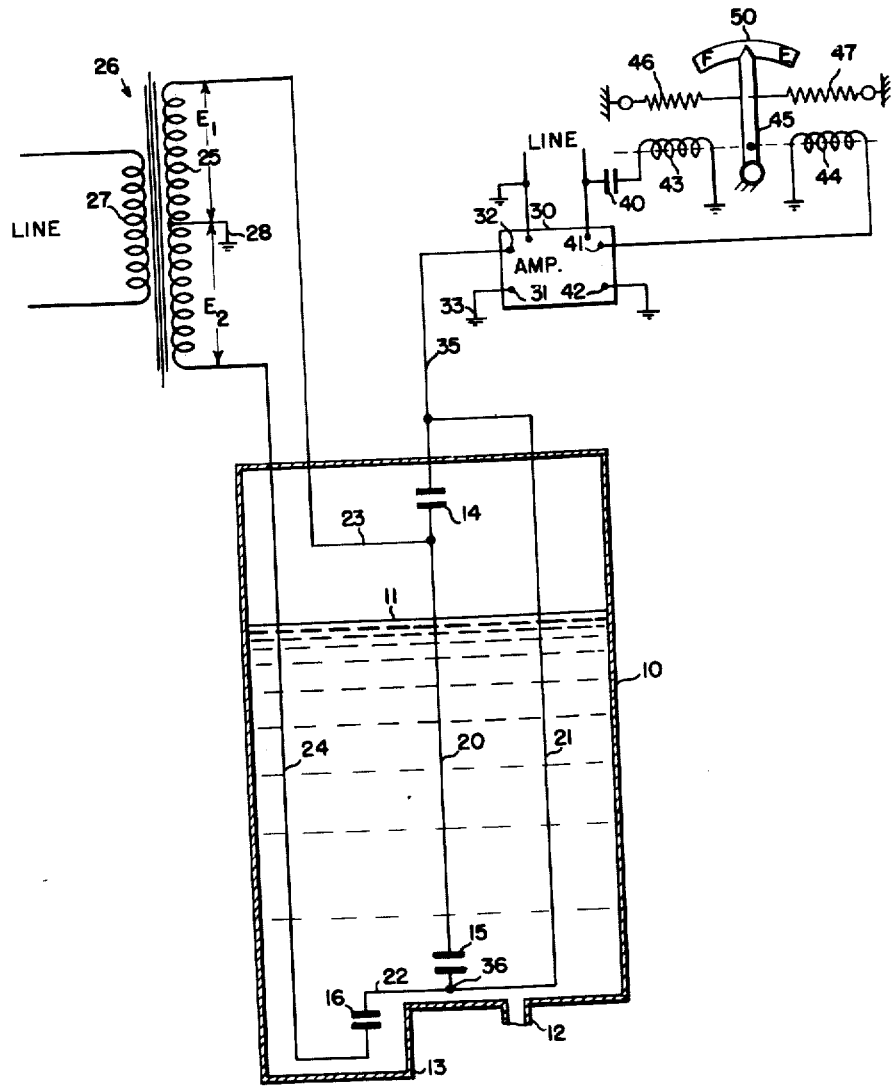
INVENTOR.
JOHN F. STORM
BY George H. Fisher
ATTORNEY

United States Patent Office

2,787,783
Patented Apr. 2, 1957

2,787,783

LIQUID LEVEL INDICATORS

John F. Storm, Minneapolis, Minn., assignor to Minneapolis-Honeywell Regulator Company, Minneapolis, Minn., a corporation of Delaware Application June 18, 1954, Serial No. 437,842

9 Claims. (Cl. 340—244)

This invention is concerned with a control apparatus, and more particularly with a liquid level sensing control apparatus.

In the present invention liquid sensitive impedance means, for example, a capacitor is used to sense the high and low level of a liquid such as an aircraft type fuel. Prior art devices make use of floats in order to indicate high and low level. With the use of a float, error is introduced into the system when the liquid foams since the float in many cases indicates the level of the foam and not the level of the liquid. Also, the float type devices are sensitive to vibrations and have a tendency to stick and become inoperative. A level sensing apparatus making use of electrical impedance probes is not subject to the above mentioned difficulties which occur when using a float type device for sensing liquid level.

It is therefore an object of the present invention to provide an improved control apparatus wherein liquid sensitive impedance means are provided and connected in a circuit to indicate high and low level of a liquid the level of which is to be set.

Another object of the present invention is to provide a control apparatus having capacitive type impedance probes disposed at the top and bottom of the container which holds the liquid the level of which is to be sensed, and having a compensating type capacitive probe located to be continuously subjected to the liquid the level of which is to be measured, and having voltage responsive means connected with the capacitive probe to a source of power to form a bridge type circuit such that the voltage applied to the voltage responsive means is indicative of the level of the liquid in the container.

These and other objects of the present invention will be apparent to those skilled in the art upon reference to the specification, claims, and drawings of which the single figure is a schematic and diagrammatic representation of the improved control apparatus.

Referring to the drawing, the numeral 10 indicates a container, such as an aircraft fuel tank, which holds a liquid or fuel 11 the level of which is to be sensed. The container 10 is provided with an outlet 12 through which the liquid 11 is drawn and is further provided with a well portion 13 which is located below the outlet 12 so that the liquid is always present in the well portion 13. It is to be understood that the particular container 10 as shown in the drawing is shown only for purposes of explanation and the container may take any shape. The container 10, for example, could be formed with well portion 13 above the outlet 12 provided the well portion 13 be formed in the manner so that the well portion would not be drained of liquid as the level of the liquid 11 dropped as the container 10 is emptied. Also, as will be pointed out later, the container 10 could be formed without the well portion 13 in which case an auxiliary container for liquid could be provided for the impedance to be later described.

Within the container 10 are three liquid sensitive electrical impedance means 14, 15 and 16. The impedance means 14 is disposed in the upper portion of the container 10 and is immersed in the liquid 11 when the container 10 is full. The liquid sensitive impedance element 15 is positioned at the lower portion of the container 10 and is immersed in the liquid 11 until the container 10 is empty. When the container 10 is empty both of the impedance means 14 and 15 are no longer immersed in the liquid 11.

The liquid sensitive impedance means 16 is disposed in the well portion 13 of the container 10 and is at all times immersed in the liquid 11. This impedance means 16 serves as a compensating type impedance means since it is at all times subjected to the liquid in the container 10 and is therefore at all times affected by changes in the characteristics of the liquid which may occur due to such factors such as temperature or pressure.

In the drawing, the impedance means 14, 15 and 16 are shown to be an open type capacitor. That is, the dielectric substance between the plates of the capacitor consists of the medium in which the capacitive unit is placed. For example, in the drawing the level of the liquid 11 is shown to be between the full and empty condition. In this case, the dielectric medium between the plates of the impedance means 14 is the air above the liquid 11. The dielectric substance between the plates of the impedance means 15 is the liquid 11. Therefore, the capacitance value of the impedance means 14 and 15 would be determined by the dielectric constant of the air and the liquid respectively.

Since the impedance means 16 is at all times immersed in the liquid 11 the capacitance value of this impedance means remains constant and is determined by the dielectric constant of the liquid 11. As the dielectric constant of the liquid 11 changes, due to such things as temperature and pressure, the capacitance value of the impedance means 16 also changes. However, as long as the dielectric constant of the liquid 11 remains constant the capacitance of the impedance means 16 also remains constant.

It will be recognized by those skilled in the art that the impedance means 14, 15 and 16 do not necessarily have to be capacitive type probes but can be any type of an impedance means which is sensitive to liquid, that is, any impedance means whose impedance changes as the impedance means is immersed in a liquid.

Referring again to the drawing, a conductor 20 and a conductor 21 connect the impedance means 14 and 15 in parallel and a conductor 22 connects the impedance means 16 in series with the parallel connected impedance means 14 and 15 at tap 36 to thereby form a series circuit. This series circuit is connected by conductors 23 and 24 to a tapped secondary 25 of a transformer 26 having a primary 27. The primary 27 is adapted to be connected to an alternating current source of power, not shown. The tap of the secondary 25 is grounded at ground connection 28.

A voltage responsive means in the form of an amplifier 30 has its input terminals 31 and 32 connected between the ground connection 28 and the connection of impedance means 16 to the parallel connected impedance means 14 and 15. This can be seen by tracing a circuit from ground connection 28 to ground connection 33, amplifier input terminal 31, amplifier input terminal 32, conductor 35, and conductor 21 to the tap 36.

Amplifier 30 is a phase sensitive amplifier and may be of the type shown in the Albert P. Upton Patent No. 2,423,534. Amplifier 30 is provided with output terminals 41 and 42. Connected to output terminals 41 and 42 is a coil winding 44 of a torque motor. A second winding 43 of the torque motor is connected to power lines through a phase shifting capacitor 40. Coil windings 43 and 44 are associated with a movable indicating pointer 45 such that the position of the pointer 45 depends upon the relative energization of windings 43 and 44. Biasing springs 46 and 47 are provided to bias the indicating pointer 45. Cooperating with the indicating pointer 45 is a scale 50 which can be calibrated to indicate the full and empty conditions of the container 10, as indicated by the letters F and E placed at the extreme ends of the scale 50.

It will be recognized that coils 43 and 44 could co-operate to control a great variety of means, for example, a valve.

The operation of this voltage responsive means is such that when voltage of a first phase or sense is applied to input terminals 31 and 32, the winding 44 is energized in a first sense to effect movement of the indicating pointer 45. When a signal of the opposite or sense is applied to the input terminals 31 and 32, winding 44 is energized in the opposite sense and movement of the pointer 45 is effected in the opposite direction.

It can be readily seen that the system above described is essentially a bridge type circuit. The above described voltage responsive means is connected across the bridge between ground terminal 28 and junction 36. The first and second legs of the bridge can be considered to be the upper and lower portions of the secondary 25 respectively. The third leg of the bridge is connected to the upper terminal of the secondary 25 and consists of the parallel connected impedance means 14 and 15. The fourth leg of the bridge is connected to the lower terminal of the secondary 25 and consists of the impedance means 16.

The operation of the control apparatus can be described by designating the voltage from the ground terminal 28 to the upper terminal secondary 25 as a voltage $E_1$ and designating the voltage from the terminal 28 to the lower terminal of secondary 25 as $E_2$. With the conditions as shown, that is, with impedance means 15 and 16 immersed and impedance means 14 not immersed in liquid, the bridge is at balance. It can be shown that with the bridge circuit at balance, that is with substantially zero input voltage to input terminals 31 and 32, the product of $E_2$ and the capacitance of impedance means 16, 16 being immersed in liquid, is equal to the product of $E_1$ and the capacitance of impedance means 14 and 15 connected in parallel, 14 not being immersed in liquid and 15 being immersed in liquid. It should be noted that secondary 25 need not be center tapped, or in other words, $E_1$ need not be equal to $E_2$.

With the bridge type circuit at balance, the amplifier 30 is ineffective to energize winding 44 and the indicating pointer 45 assumes a position such as shown in the drawing, the position being controlled by the biasing effect by the springs 46 and 47.

If it is now assumed that the level of the fuel 11 drops from the level shown in the drawing, the point will eventually be reached where the impedance means 15 is no longer immersed in the liquid 11. The dielectric constant of the liquid 11 is greater than that of air and therefore the capacitance of impedance means 15 is reduced and the impedance is increased. Therefore, the potential level of tap 36 is no longer the same as the potential level of ground connection 28. Referring to the secondary 25, the potential level of junction 36 is now somewhere between the potential level of ground connection 28 and the potential level of the lower terminal of secondary 25. This causes a signal of a first phase or sense to be applied to the input terminals 31 and 32 and causes winding 44 to be energized to effect movement of the indicating pointer 45 to the right to the empty indication on the scale 50. If the liquid 11 is now replaced in the container 10 the pointer 45 again assumes a position shown in the drawing when the condition is reached where the impedance means 15 is immersed in liquid and the impedance means 14 is not immersed in liquid, such as shown in the drawing. As filling of the container 10 continues the point is eventually reached where the container is full and impedance means 14 is immersed in the liquid. In this condition the capacitance of impedance means 14 increases since the dielectric constant of the liquid is assumed to be greater than that of air. This increase in capacitance causes a decrease in impedance and it thereby decreases the total impedance in the third leg of the above mentioned bridge. This causes the voltage level of junction 36 to lie somewhere between the impedance level of ground connection 28 and the upper terminal of secondary 25. Therefore, a signal of a second phase or sense is applied to the input terminals 31 and 32 and winding 44 is energized to effect movement of indicating pointer 45 to the left or to the full indication on scale 50.

The dielectric constant of the liquid 11 is sometimes affected by conditions such as temperature and pressure. This would cause the capacitance and thereby the impedance of the impedance means 14, 15 or 16, which are immersed in the liquid to also vary. However, since the impedance means 16 is connected in the fourth leg of the bridge any changes in capacitance of impedance means 14 or 15 is offset by change in capacitance of impedance means 16 and therefore no error, or negligible error, is introduced into the improved control apparatus. It will immediately be recognized that the impedance means 16 need not be immersed in the liquid within the container 10 but could be placed in an auxiliary container containing liquid which would be affected by the same conditions by which the liquid in container 10 is affected.

While I have shown and described a certain embodiment of my invention, modifications will readily occur to those skilled in the art, and I therefore intend my invention to be limited only by the scope of the appended claims.

I claim as my invention:

1. Level indicating apparatus comprising, first and second electrical liquid level sensing means arranged to be positioned at a first level and at a second level respectively in a container containing liquid the level of which is to be indicated, said first and second sensing means being responsive to a characteristic of the liquid, means connecting said first and second electrical means in parallel, third electrical means normally totally immersed in the liquid and responsive to said characteristic of the liquid, means connecting said third electrical means in series with said parallel connected first and second electrical means, a source of electrical power, means connecting said series connected first, second, and third electrical means to said source of electrical power, and electrically operated level indicating means connected to the connection of said third electrical means and said parallel connected first and second electrical means and connected to said source of electrical power.

2. Level sensing apparatus comprising, first and second electrical impedance means whose impedance varies as said first or second impedance means is immersed in a liquid and as a function of a characteristic of the liquid, said first and second impedance means being arranged to be located at a first and a second level respectively in a container holding liquid the level of which is to be sensed, third electrical impedance means normally totally immersed in the liquid and responsive to said characteristic of the liquid, means connecting said first and second impedance means in parallel, means connecting said parallel connected first and second impedance means in a series circuit with said third impedance means, a source of electrical voltage, means connecting said series circuit to said source of electrical voltage, voltage responsive means, and means connecting said voltage responsive means to the connection of said parallel connected first and second impedance means and said third impedance means and to said source of electrical voltage.

3. Level sensing apparatus comprising, first and second electrical impedance means whose impedance changes when said first and second impedance means is placed in a liquid, said first and second impedance means being arranged to be located at a first and a second level respectively in a container holding liquid the level of which is to be sensed, said first and second impedance means responsive to a characteristic of the liquid, means connecting said first and second impedance means in parallel, third electrical impedance means normally totally immersed in the liquid and responsive to said characteristic of the liquid, means connecting one end of said third impedance means in series with one end of said parallel connected first and second impedance means to thereby form a junction, a source of electrical voltage having a first output terminal of a first voltage level, a second output terminal of a second voltage level, and a third output terminal of a voltage level intermediate said first and second voltage levels, means connecting the free end of said parallel connected first and second impedance means to said first terminal, means connecting the free end of said third impedance means to said second terminal, voltage responsive means, and means connecting said voltage responsive means to said third terminal and to said junction.

4. Level sensing apparatus comprising, a container arranged to contain the liquid the level of which is to be sensed, first electrical impedance means whose impedance changes when placed in a liquid positioned at a first level within said container, second electrical impedance means whose impedance changes when placed in a liquid positioned at a second level within said container, said first and second impedance means being responsive to a characteristic of the liquid, means connecting said first and second impedance means in parallel to form a first and a second junction, third electrical impedance means normally totally immersed in the liquid and responsive to said characteristic of the liquid and having a third and a fourth junction, means connecting the first junction of said parallel connected first and second impedance means to the third junction of said third impedance means, a source of electrical voltage, means connecting said second junction to said source of voltage, means connecting said fourth junction to said source of voltage, voltage responsive means including level indicating means, and means connecting said voltage responsive means to said source of electrical voltage and to said first and third junctions.

5. Level indicating apparatus comprising, a first open type capacitor arranged to have a dielectric constant in accordance with the environment in which said first capacitor is placed, a second open type capacitor arranged to have a dielectric constant in accordance with the environment in which said second capacitor is placed, said first and second capacitors arranged to be placed at a first and a second level respectively in a container holding liquid the level of which is to be indicated, means electrically connecting said first and second capacitors in parallel, a third open type capacitor normally totally immersed in the liquid and whose capacitance reactance varies with changes in the dielectric constant of the liquid, means electrically connecting said third capacitor in a series circuit with said first and second parallel connected capacitors, a source of electrical voltage, means electrically connecting said series circuit to said source of electrical voltage, voltage responsive means including level indicating means, and means electrically connecting said voltage responsive means to said source of electrical voltage and to the connection of said third capacitor to said parallel connected first and second capacitors.

6. Level sensing apparatus comprising, a first capacitor whose capacitive reactance varies in accordance with the environment in which said first capacitor is placed, a second capacitor whose capacitive reactance varies in accordance with the environment in which said second capacitor is placed, a container arranged to hold a liquid the level of which is to be sensed and having said first and second capacitors disposed at a first and a second level respectively within said container, means electrically connecting said first and second capacitors normally totally immersed in the liquid and whose capacitive reactance varies with changes in the dielectric constant of the liquid in parallel, a third capacitor, means electrically connecting said third capacitor in a series circuit with said parallel connected first and second capacitors, a source of alternating current voltage having a first output terminal of a first voltage level, a second output terminal of a second voltage level, and a third output terminal of a voltage level intermediate said first and second voltage levels, means electrically connecting said series circuit to said first and second terminals of said alternating current source of voltage, voltage responsive means, and means electrically connecting said voltage responsive means to the third terminal of said alternating current source of power and to the connection of said third capacitor to said parallel connected first and second capacitors.

7. Level sensing apparatus comprising a liquid container having an outlet at a bottom portion thereof and having a well portion below the level of said outlet, said container being adapted to hold a liquid the level of which is to be sensed, first capacitive means disposed at the top of said container and having a capacitive reactance which changes when said first capacitor is submerged in a liquid, second capacitive means disposed at the bottom of said container above said outlet and having a capacitive reactance which changes as said second capacitive means is submerged in a liquid, means electrically connecting said first and second capacitive means in parallel, a third capacitive means disposed in the well of said container and normally submerged in the liquid and having a capacitive reactance which varies with changes in the dielectric constant of the liquid, means electrically connecting said third capacitive means in a series circuit with said parallel connected first and second capacitive means, a source of alternating current power having first and second output terminals and having a third output terminal at a potential level intermediate the potential levels of said first and second output terminals, means electrically connecting said series circuit to said first and second terminals of said alternating current source of power, phase sensitive voltage responsive means, and means electrically connecting said voltage responsive means to the third terminal of said alternating current source of power and to the connection of said third capacitive means to said parallel connected first and second capacitive means.

8. Level sensing apparatus comprising; first liquid sensitive impedance means having an impedance value which changes as said first impedance means is placed in a liquid, second liquid sensitive impedance means having an impedance value which changes as said second impedance means is placed in a liquid, said first and second impedance means being responsive to a characteristic of the liquid, a container for liquid the level of which is to be sensed and having said first and second impedance means disposed at a first and a second level respectively within said container in a manner so that both said first and second impedance means are immersed in liquid when said container is full and both said first and second impedance means are not immersed in liquid when said container is empty, third liquid sensitive impedance means arranged to be at all times immersed in liquid and responsive to said characteristic of the liquid; a bridge type circuit, a source of voltage; voltage responsive means having input terminals, means connecting a first of said input terminals to said source of voltage, means connecting said first and second impedance means to said source of voltage and to a second of said input terminals to thereby form a first leg of said bridge type circuit, and means connecting said third impedance means to said source of voltage and to said second of said input terminals to thereby form a second leg of said bridge type circuit, the voltage impressed upon said first and said second input terminals being indicative of the level within said container.

9. Liquid level sensing apparatus comprising: a bridge type circuit having input terminals and output terminals; a source of voltage connected to said input terminals; a first and a second liquid level sensitive impedance means arranged to be placed at a first and a second level respectively in a container holding a liquid the level of which is to be sensed, said first and second impedance means being responsive to a characteristic of the liquid, and connected in parallel and connected in a leg of said bridge; a third liquid sensitive impedance means normally totally immersed in the liquid and responsive to said characteristic of the liquid and connected in an adjacent leg of said bridge; and voltage responsive means connected to the output terminals of said bridge.

References Cited in the file of this patent

UNITED STATES PATENTS

| | | |
|---|---|---|
| 1,520,004 | Bloch | Dec. 23, 1924 |
| 1,650,986 | Herthel | Nov. 29, 1927 |
| 2,188,628 | Freystedt | Jan. 30, 1940 |
| 2,541,743 | Brockman | Feb. 13, 1951 |
| 2,683,371 | Droin | July 13, 1954 |

FOREIGN PATENTS

| | | |
|---|---|---|
| 114,980 | Sweden | Sept. 18, 1945 |

OTHER REFERENCES

Publication: "Airplane Fuel Gage," by Curtis R. Schafer in Electronics, April 1950, pp. 77–79.

UNITED STATES PATENT OFFICE

CERTIFICATE OF CORRECTION

Patent No. 2,787,783                                 April 2, 1957

John F. Storm

It is hereby certified that error appears in the printed specification of the above numbered patent requiring correction and that the said Letters Patent should read as corrected below.

Column 6, lines 4 to 7, should read as shown below instead of as in the patent —

> necting said first and second capacitors in
> parallel, a third capacitor normally totally
> immersed in the liquid and whose capacitive
> reactance varies with changes in the dielectric
> constant of the liquid, means electrically Signed and sealed this 3rd day of December 1957.

(SEAL)
Attest:
KARL H. AXLINE

Attesting Officer

ROBERT C. WATSON
Commissioner of Patents